July 1, 1930.   B. L. MALLORY   1,769,444
SHOCK ABSORBER
Filed Nov. 20, 1924   3 Sheets-Sheet 1
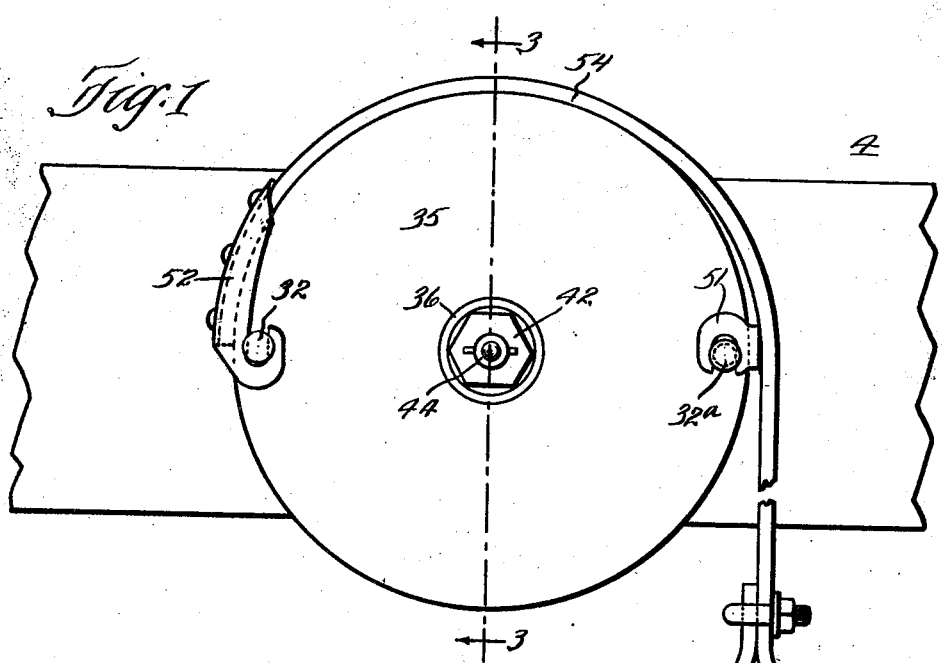
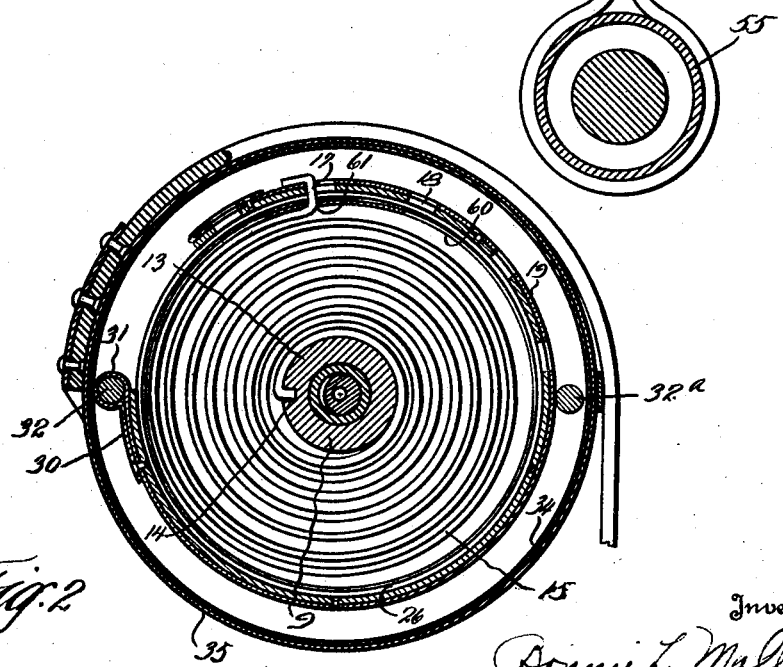

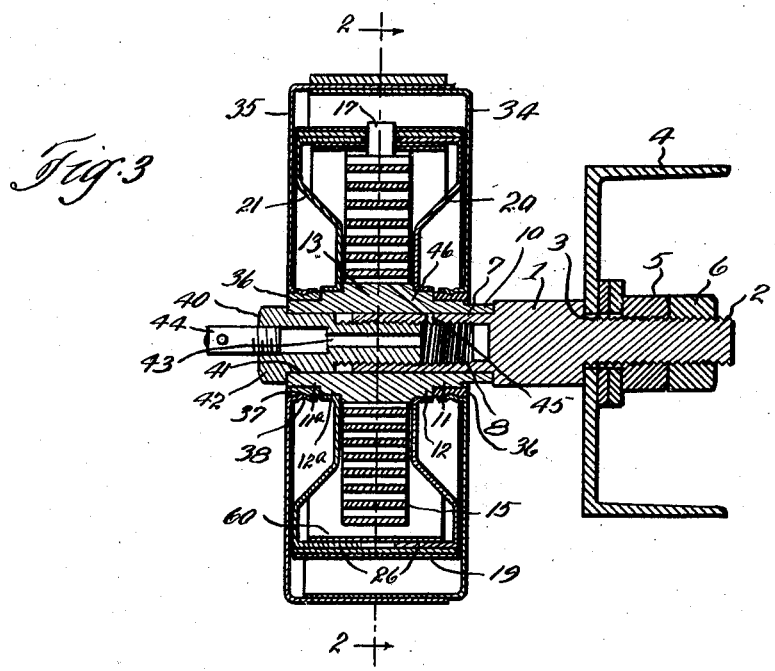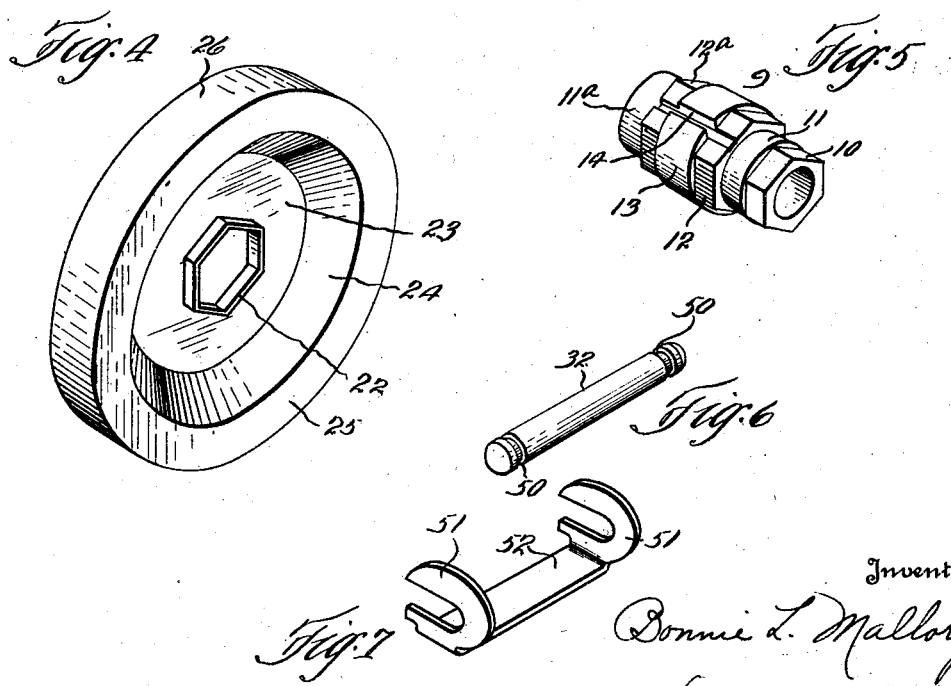

July 1, 1930.  B. L. MALLORY  1,769,444
SHOCK ABSORBER
Filed Nov. 20, 1924   3 Sheets-Sheet 3
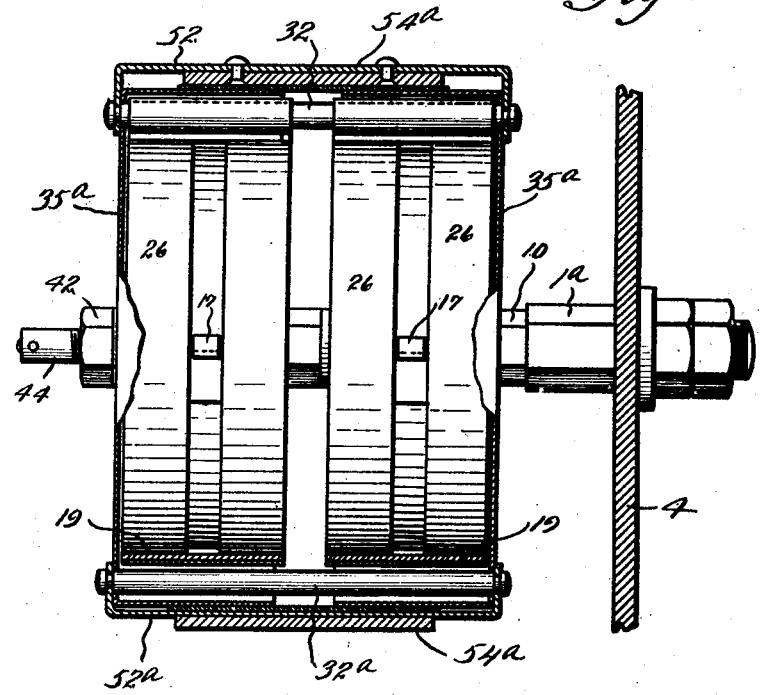
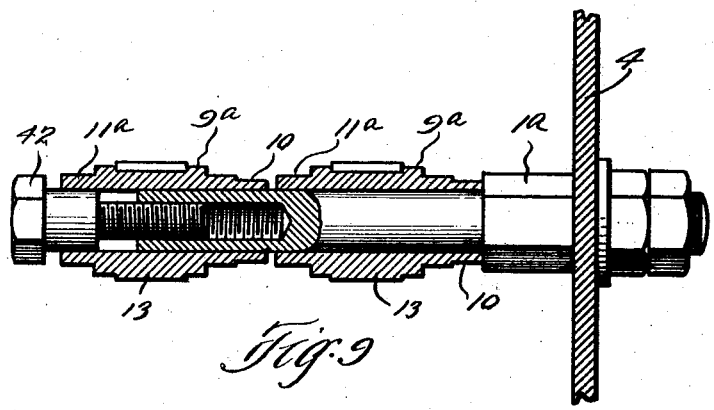

Patented July 1, 1930

1,769,444

UNITED STATES PATENT OFFICE

BONNIE L. MALLORY, OF CLEVELAND, OHIO

SHOCK ABSORBER

Application filed November 20, 1924. Serial No. 750,970.

This invention relates to shock absorbing devices and has particular reference to a device for controlling the rebound action of a vehicle spring.

The primary object of the present invention is to provide a shock absorbing device which shall include a coil spring that normally maintains a tension on a belt which connects the device with the running gear of the vehicle, so that when the running gear and vehicle frame move toward each other, the spring will serve to take up the slack in the belt and as the running gear and vehicle frame separate, such separation will be against the tension of the spring and also against the tension of a brake which shall be automatically applied.

Another object is to provide a device of this character which shall be composed largely of sheet metal stampings, thereby reducing the cost of construction to a minimum and greatly facilitating the manufacture of these devices.

A still further object is to provide a shock absorbing device which will be entirely enclosed and hence weather proof and dust proof and which may be easily lubricated from the exterior so that the various parts of the device may be flooded with grease to insure easy and efficient operation thereof.

A still further object is to provide a device of the aforesaid character which may be adjusted to vary the tension of the recoil spring and thereby adjust the device to various weight vehicles, or which may be easily mounted in tandem for use with exceptionally heavy vehicles such as fire apparatus and trucks.

With these and other objects in view, the invention consists in the various novel features of construction and arrangement or combination, all of which will be fully described hereinafter and pointed out in the appended claims.

In the drawings accompanying and forming a part of this application Fig. 1 is a side elevation of a shock absorbing device constructed in accordance with my invention and showing the same mounted upon a vehicle chassis; Fig. 2 is a vertical sectional view taken on the line 2—2 of Fig. 3; Fig. 3 is a vertical sectional view corresponding to the line 3—3 of Fig. 1; Fig. 4 is a perspective view of one of the brake drum sections; Fig. 5 is a perspective view of the hub portion of my shock absorbing device; Fig. 6 is a perspective view of one of the pins for retaining the casing sections together; Fig. 7 is a perspective view of one of the straps which cooperates with the pin shown in Fig. 6; Fig. 8 is a vertical sectional view showing two of my shock absorbing devices mounted in tandem; and Fig. 9 is a detail sectional view of the supporting assembly for the tandem arrangement shown in Fig. 8.

Describing the various parts by reference characters, 1 denotes a stud or shaft which supports my device. This stud or shaft is provided at one end with a reduced threaded portion 2 that is adapted to project through a suitable aperture 3 in a vehicle frame 4. A nut 5 threaded on the reduced end 2 serves to fasten the shaft 1 to the frame and a lock nut 6 retains the parts in position. The opposite end of the shaft 1 is reduced as indicated at 7 and is provided with an internally threaded bore 8.

A hub 9, as shown in detail in Fig. 5, is rotatably mounted on the reduced end 7, and this hub is provided with a hexagonal shaped end portion 10, a circular bearing portion 11, an enlarged hexagonal portion 12, and a circular portion 13. The opposite end portion of the hub is provided with a hexagonal portion $12^a$ and a reduced circular bearing portion $11^a$ similar to the corresponding parts 12 and 11. A longitudinal groove 14 extends through the central portion 9 and through hexagonal portions 12 and $12^a$, and this slot is adapted to receive and retain the inner end of a coil spring 15, as clearly shown in Fig. 2. The opposite end of this spring is bent upwardly and backwardly to define a hooked portion 17 which is adapted to be engaged in any of a plurality of apertures 18 formed in a brake band 19. This brake band is engaged about a brake drum which is composed of two sections 20 and 21. Each of these brake drum sections is preferably formed from sheet metal and is provided with a hexagonal shaped central aperture 22, a central disk portion 23, which merges into an outwardly flared portion 24. The outwardly flared portion 24 merges into an annular side wall 25 which is turned over to define the brake drum proper designated at 26. The brake drum section 20 is mounted upon the hexagonal portion 12 of the hub and the brake drum section 21 is mounted upon the corresponding hexagonal portion 12ª thereof and it will be noted that when these drum sections are in position, they are arranged in spaced relation so that the outer hooked portion 17 of the spring 15 may project outwardly therebetween.

The opposite end of the brake band 19 is fitted with a sheet metal anchor piece 30 which is bent upon itself to define a tubular portion 31. This end of the brake band is anchored to the casing enclosing the device by means of a pin 32 which extends transversely therethrough.

The casing which encloses the device is composed of two sheet metal cup shaped sections 34 and 35 which are adapted to telescope one within the other, as shown in Fig. 3. Each of these sections is fitted at its center with a bushing 36 which is adapted to engage upon the respective reduced circular portions 11 and 11ª of the hub 9. The bushings may be conveniently retained in the housing sections by providing each bushing with a circular groove 37 and by spinning the collar 38 of each housing section into this groove.

The device as a unit is retained on the reduced end 7 of the shaft 1 and locked thereto by means of a stud 40 which is threaded into the internally threaded bore 8. This stud is formed with a cylindrical portion 41 that is adapted to snugly engage the internal bore of the hub, and the outer end of the stud is preferably formed with a wrench receiving portion 42 so that the same may be tightened against the outer end of shaft 1. As shown in Fig. 3 the stud 40 is provided with a bore 43 extending longitudinally therethrough so that lubricant may be introduced through an Alemite or other suitable connection 44 threaded in the outer end thereof. The lubricant entering bore 43 is discharged into threaded bore 8, and from thence through a bore 45 in the reduced portion 7 of shaft 1, and thence through a bore 46 in the hub 9, into the housing enclosing the device.

The housing sections 34 and 35 are normally secured together by means of pins 32 and 32ª, the former serving also to anchor one end of the brake band as previously described and the other projecting through the casing sections at a point diametrically opposite pin 32. The outer ends of each of these pins is grooved as indicated at 50 so as to receive the hook shaped ends 51 of a U-shaped strap 52 that is adapted to extend transversely across the outer periphery of the casing. These straps together with their hook shaped ends 51 cooperate with the end portions 50 of the pins 32 and 32ª to securely retain the casing sections together. The strap 52 which engages with pin 32 is enlarged so as to be secured to one end of a belt 54 that is disposed about the casing and has the opposite end thereof fastened in any suitable manner about the vehicle running gear indicated generally at 55.

In assembling the device above described, the coil spring 15 is placed under a suitable tension and retained under such tension by means of a metal band 60 which extends circumferentially thereabout and which is provided with aligning apertures 61 in the overlapping ends thereof. The hooked outer end 17 of the spring is engaged through apertures 61 which locks this band about the spring. The band 60 is preferably made of brass so as to provide a bearing surface between the spring and inner surfaces of the brake drums. This band also serves to close the opening between the brake drum sections as pointed out hereinafter, and it also permits the coil spring to be placed under a suitable tension before assembling thereby facilitating the handling and assembling of the spring in the device.

The brake drum section 20 is positioned on the hub so as to seat on the hexagonal portion 12, after which the coil spring, already under tension, is slipped on the hub so that the inner end thereof engages in slot 14, whereupon the other brake drum section 21 is seated on hexagonal portion 12ª. As shown in Fig. 3 the band 60 normally closes the space between the brake drum sections. The brake band 19 is next positioned about the brake drums so that the hooked end 17 of the spring is engaged in one of the apertures 18 formed therein, depending upon the weight of the car on which the device is to be installed. If the car is heavy, the hooked end 17 is engaged in one of the apertures 18 that is nearer the opposite end 30 of the brake band while, for very light weight cars, the hooked end 17 may be engaged in an aperture 18 nearer the free end of the brake band. The casing section 34 is now slipped on the cylindrical portion 11 of the hub and the other casing section 35 is telescoped over section 34 and seated on the cylindrical outer end 11ª of the hub. Pin 32 is inserted through suitable apertures in the casing and also through the tubular opening 31 in one end of the brake band. The other pin 32ª is then inserted through aligning apertures in the casing and the casing locked together as previously described. The unit is easily and quickly installed on a vehicle by slipping the hub on the reduced end of shaft 1 and holding the same in position by tightening stud 40. Belt 54 is then fastened to the vehicle running gear, after which the slack is taken up by rotating the shock absorber unit and then stud 40 is tightened to lock the hub and unit to the shaft 1, such tightening being facilitated by holding the hub in adjusted position with a wrench engaged on hexagonal portion 10 thereof while the stud is rotated by means of a wrench engaged on the head 43 thereof.

When the car strikes a bump or depression in the road causing the vehicle running gear to approach the frame, the coil spring 15 being under tension, tends to expand and thereby rotate the brake band 19 which in turn exerts a pull on pin 32 and hence rotates the casing sections 34 and 35 to wind up the slack in belt 54. On the rebound stroke of the vehicle spring, when it is necessary to control the spring action, the vehicle running gear 55 moves away from the vehicle frame 4 and exerts a pull on belt 54. This pull is transmitted through pin 32 to the brake band 19 to snugly engage the same about the brake drum sections. The opposite end of the brake band 19 being connected to the outer hooked end 17 of the coil spring 15 is resiliently held and hence the action of the brake band 19 on the brake drum sections is gradual at first but increases as the rotational effect of the device increases, due to the increase in tension of the spring 15.

In Figs. 8 and 9 I have shown a modified form of construction which is designed particularly for very heavy vehicles such as fire apparatus, trucks and similar vehicles. The construction of the shock absorbing units is essentially the same as previously described except that in the present instance the supporting shaft 1ª is considerably elongated so as to accommodate the two hub portions 9ª. The pins 32 and 32ª which retain the telescoping housing sections 34ª and 35ª in position, are also considerably longer so as to extend through the increased width of the device. The straps 52 and 52ª are also of increased length to take care of the increased width of the tandem device. The tandem device is controlled as a unit by a single belt 54ª which is engaged about the outer circumferential surface of the housing sections.

The operation of this tandem unit is identical with that previously described, it being understood, of course, that the pull in either direction on the belt 54ª is substantially twice that of the single unit previously described.

Having thus described my invention, what I claim is:

1. A shock absorbing device comprising a hub adapted to be connected to a vehicle chassis, a coil spring disposed about said hub and having one end fastened thereto, a brake drum enclosing said spring, a brake band disposed about said drum and connected to said spring, a casing enclosing said brake drum, a connection between said brake band and said casing and a belt connected to said casing and to the vehicle running gear.

2. A shock absorbing device comprising a shaft adapted to be connected to a vehicle chassis, a hub detachably connected to said shaft, a coil spring having its inner end connected to said hub, a pair of brake drum sections fitted to said hub and normally enclosing said spring, a brake band disposed about said drum sections, and connected to said spring, and means for connecting said brake band with the vehicle running gear.

3. A shock absorbing device comprising a shaft adapted to be connected to a vehicle chassis, a hub detachably connected to said shaft, a coil spring having its inner end connected to said hub, a pair of brake drum sections fitted to said hub and normally enclosing said spring, a brake band disposed about said drum sections and having an end portion connected to the outer end of said spring, a casing enclosing said brake drum sections, means connecting the opposite end of said brake band to said casing, and a belt disposed about said casing and having one end adapted to be connected to the vehicle running gear and the opposite end connected to said casing.

4. A shock absorbing device comprising a shaft adapted to be connected to a vehicle chassis, a hub detachably connected to said shaft, a coil spring having its inner end connected to said hub, a pair of brake drum sections fitted to said hub and normally enclosing said spring, a brake band disposed about said drum sections, means adjustably connecting said band with the outer end of said spring, a casing enclosing said brake drum sections, a connection between the opposite end of said brake band and said casing and a belt connected to and disposed about said casing and adapted to be connected to the vehicle running gear.

5. A shock absorbing device comprising a shaft adapted to be connected to a vehicle chassis, a hub detachably connected to said shaft, a coil spring having its inner end connected to said hub, a pair of brake drum sections fitted to said hub and normally enclosing said spring, a bearing member interposed between said spring and said drum sections, a brake band disposed about said drum sections, means adjustably connecting said band with the outer end of said spring, a casing enclosing said brake drum sections, a connection between the opposite end of said brake band and said casing, and a belt connected to and disposed about said casing and adapted to be connected to the vehicle running gear.

6. A shock absorbing device adapted to be connected to a vehicle chassis and comprising a shaft, a plurality of shock absorbing units mounted on said shaft and enclosed within a single housing so as to provide a weather-proof and lubricant tight casing, a single flexible member secured to said casing and operatively connected with each of said shock absorbing units and a connection between said flexible element and the vehicle running gear.

7. A shock absorbing device adapted to be connected to a vehicle chassis and comprising a shaft, a plurality of shock absorbing units mounted on said shaft, a casing enclosing said shock absorbing units and rotatably supported upon said shaft and consisting of opposed interengaging sections, said shock absorbing units being connected with said casing and a single flexible connection having one end connected with said casing and its opposite end connected with the vehicle running gear.

8. A device for retarding motion between two relatively movable members comprising a casing supported for rotation upon an axis fixed with respect to one of said members, a flexible element extended circumferentially about the casing and having its opposite ends connected respectively to the casing and to the other of said members whereby upon relative movement between said members the casing will be caused to rotate, and mechanism inside the casing for rotating it in one direction and for retarding its rotation, said mechanism including a coil spring having one end connected with one of said movable members and its opposite end connected with a brake band within said casing and a connection between said brake band and casing.

9. A device for retarding motion between two relatively movable members comprising a stud carried by one of said members, a spring coiled about said stud and having one of its ends secured thereto, a casing enclosing the spring and rotatably supported upon the stud, and consisting of opposed interengaging sections, a pin extended through said sections adjacent the periphery of the casing, connections between said pin and the opposite end of the spring, a flexible element extended circumferentially about the casing and having its opposite ends connected respectively to said pin and to the other of the aforesaid members, and means inside the casing for retarding its rotation.

10. A device for retarding motion between two relatively movable members comprising a stud that is adapted to be carried by one of said members, a coil spring surrounding said stud and having one of its ends secured thereto, a casing enclosing the spring and rotatably supported upon the stud and consisting of opposed interengaging sections, pins extended through the opposed sections adjacent the periphery of the casing and at points spaced apart circumferentially of the casing, connections between the opposite end of the aforesaid spring and one of said pins, clips applied to the exterior of the casing and having their ends secured to the aforesaid pins, a flexible element extended circumferentially about the casing and having its opposite ends attached respectively to one of said clips and to the other of the aforesaid members, and means inside the casing for retarding its rotation.

11. A shock absorbing device comprising a shaft adapted to be connected to a vehicle chassis, a coil spring having its inner end connected to said shaft, a pair of brake drum sections fitted on said shaft and enclosing said spring, a brake band disposed about said drum sections exteriorly thereof and having the end portion connected to the outer end of said spring, a casing enclosing said brake drum sections, means connecting the opposite end of said brake band to said casing and a belt disposed about said casing and having one end adapted to be connected to the vehicle running gear and its opposite end connected to said casing.

12. A shock absorbing device comprising a shaft adapted to be connected to a vehicle chassis, a coil spring having its inner end connected to said shaft, a pair of brake drum sections fitted on said shaft and enclosing said spring, a brake band disposed about said drum sections exteriorly thereof, means connecting said brake band with the outer end of said spring, a casing enclosing said brake drum sections, a connection between the opposite end of said brake band and said casing and a belt connected to and disposed about said casing and adapted to be connected to a vehicle running gear.

13. A device for retarding the motion between two relatively movable members comprising a weatherproof, lubricant-tight casing, a stud carried by one of said members and whereon said casing is rotatable, a spring enclosed by said casing and having one of its ends connected with said stud, a brake drum surrounding said spring, a brake band connected with said casing and partially encircling said brake drum exteriorly thereof and connected with the opposite end of said spring, and connections between the casing and the other of said members of such a nature that upon relative movement between said members the casing will be rotated.

14. A device for retarding the motion between two relatively movable members and comprising a stud adapted for connection with one of said movable members, a brake drum surrounding said stud and non-rotatably connected therewith, a coil spring arranged within said brake drum and having its inner end secured to said stud, a brake band wrapped about the exterior of said drum and having one of its ends connected with the opposite end of said spring through a circumferentially extending space in the periphery of said drum and its opposite end connected with said casing, and a belt having one end connected with said casing and extending partially about said casing and having its free end adapted for connection with the other of said movable members.

15. A device for retarding movement between two relatively movable members and comprising a stud adapted for attachment to one of said movable members, a casing rotatably mounted on said stud, a coil spring surrounding said stud and having one end connected thereto, a brake drum non-rotatably connected with said stud and surrounding said spring, a brake band having one end connected with said casing and partially encircling said brake drum exteriorly thereof and having its opposite end connected with the opposite end of said spring and a connection between said casing and the other of said movable members of such a nature that upon relative movement between said members the casing will be caused to rotate.

16. A device for retarding motion between two relatively movable members comprising a casing supported for rotation upon an axis fixed with respect to one of said members, a connection between said casing and the other of said movable members of such a nature that upon relative movement between said members the casing will be caused to rotate, mechanism for rotating said casing including a coil spring having one end fixed to said axis, a friction member surrounding said coil spring, a brake band extending about exteriorly thereof said friction member and having one end connected with said casing and its opposite end connected with the opposite end of said spring.

17. In mechanism for retarding motion in one direction between two relatively movable elements, a plurality of coaxially arranged drums adapted to be secured to one of said elements, a friction member in contact with said drums and adapted to be secured to said other element, and a spring so associated with one of said drums and said friction member as to tend to relatively move them in one direction, said friction member being entirely enclosed by a housing to which a flexible element is connected and said flexible element being also connected to one of said relatively movable elements.

In testimony whereof, I hereunto affix my signature.

BONNIE L. MALLORY.